April 21, 1970 J. STENCEL, JR., ET AL 3,508,229

FERRITE ELEMENT HOLDER

Filed June 21, 1967

INVENTOR.
JOHN STENCEL, JR.
HOWARD P. WHITE.

Kevin R. Peterson

ATTORNEY.

3,508,229
FERRITE ELEMENT HOLDER

John Stencel, Jr., Bloomfield Hills, and Howard P. White, Livonia, Mich., assignors to Burroughs Corporation, Detroit, Mich., a corporation of Michigan Filed June 21, 1967, Ser. No. 647,720
Int. Cl. G11b 5/10, 5/50
U.S. Cl. 340—174.1 1 Claim

ABSTRACT OF THE DISCLOSURE

An improved holder for aligning and supporting a plurality of oppositely oriented ferrite elements in a magnetic transducer. The holder is made of corrugated spring metal which is bent to form gripping faces within each corrugation. A flexure is provided at each end of the holder to resiliently support the ferrites.

SUMMARY OF THE INVENTION

The present invention relates to a holder for use in aligning and supporting a plurality of ferrite elements in a magnetic transducer. More particularly, the present invention relates to a holder for use in aligning the toe gaps in a plurality of transducers and for maintaining a fixed track spacing between each transducer of a plurality of transducers.

In recording digital information on a magnetizable substrate such as a disc or drum, it is desirable to have every stored word begin along a common line. In this way, a single timing track along the edge of the storage device can be used to enable any one of a plurality of read heads across the storage device when a given word is reached and should be read. It is essential in this type of operation that the toe gap or sensing gap in every ferrite element be precisely aligned in order to read all of the information in each word.

When a plurality of heads are used for a single magnetic storage device, it is necessary that each head occupy as little physical space as possible across the face of the device in order to provide as many data tracks as possible. It is also necessary to fix each head relative to its adjacent heads so that the data tracks are precisely defined on the storage surface.

It is, therefore, an object of the present invention to provide a holder for the ferrite elements in a plural channel magnetic transducer that will maintain both precise alignment and spacing of the ferrite elements in the transducer.

BRIEF DESCRIPTION OF THE DRAWINGS

The invention, both as to its organization and method of operation, together with further objects and advantages thereof, will best be understood by reference to the following detailed description taken in connection with the accompanying drawings, in which.

DETAILED DESCRIPTION OF THE INVENTION

Figure 1:
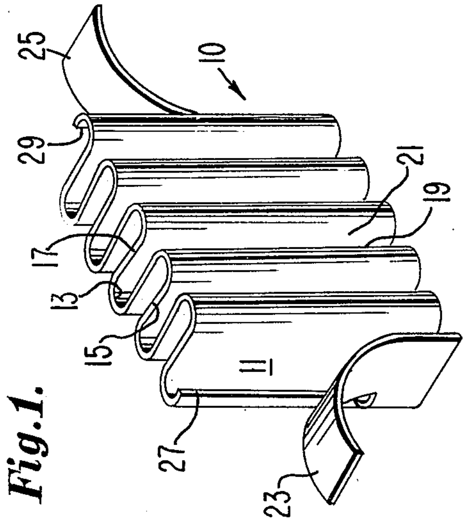
FIGURE 1 is a perspective view of the ferrite element holder of the present invention.

Referring to FIGURE 1, a ferrite element holder is provided in the form of a sinuous web designated generally by the numeral 10. The holder is made from a piece of spring metal, for example, brass, aluminum, or copper having the ability to recover its shape after a slight deformation. For purposes of the present invention, half-hard brass has been found particularly suitable.

The holder 10 should have a recess for each ferrite element that is to be used in the transducer and should be long enough to hold a substantial portion of the ferrite in order to maintain precise control of each element and also to provide an effective shield between the ferrite elements. As shown, the sinuous holder 10 provides successively oppositely facing channel-like recesses for respectively receiving the ferrite elements.

In manufacturing the web, a strip of spring metal 11 is held in a suitable fixture, not shown, and bent back and forth over itself to form a plurality of corrugations. In each corrugation, for example 13, the opposite sides 15 and 17 are bent over center to form a pair of elongate gripping faces 19 and 21. The gap between the faces 19 and 21 is made slightly smaller than the width of a ferrite element so that the faces will exert a slight compressive gripping force on the ferrite element.

Care should be exercised in selecting the type and thickness of metal to be used in the ferrite element holder 10. The metal must be resilient so that it will provide a gripping action, however, it must not be so resilient that it will tend to crush or damage the ferrite. On the other hand, it must be resilient enough to maintain control of the ferrite. For purposes of the present invention, 0.008 inch half-hard brass has been found to be particularly suitable. It is obvious, however, that other thicknesses and alloy compositions would be suitable that meet the basic requirements.

At each end of the holder 10 there is a flexure 23 and 25. The flexures can be an integral part of the holder and are made by cutting the metal web 11 along the lines 27 and 29 followed by bending the resulting tabs down and outwardly away from a common side of the web 11. The flexures can also be joined to the web 11 by, for example, brazing, welding, or riveting.

Figure 2:
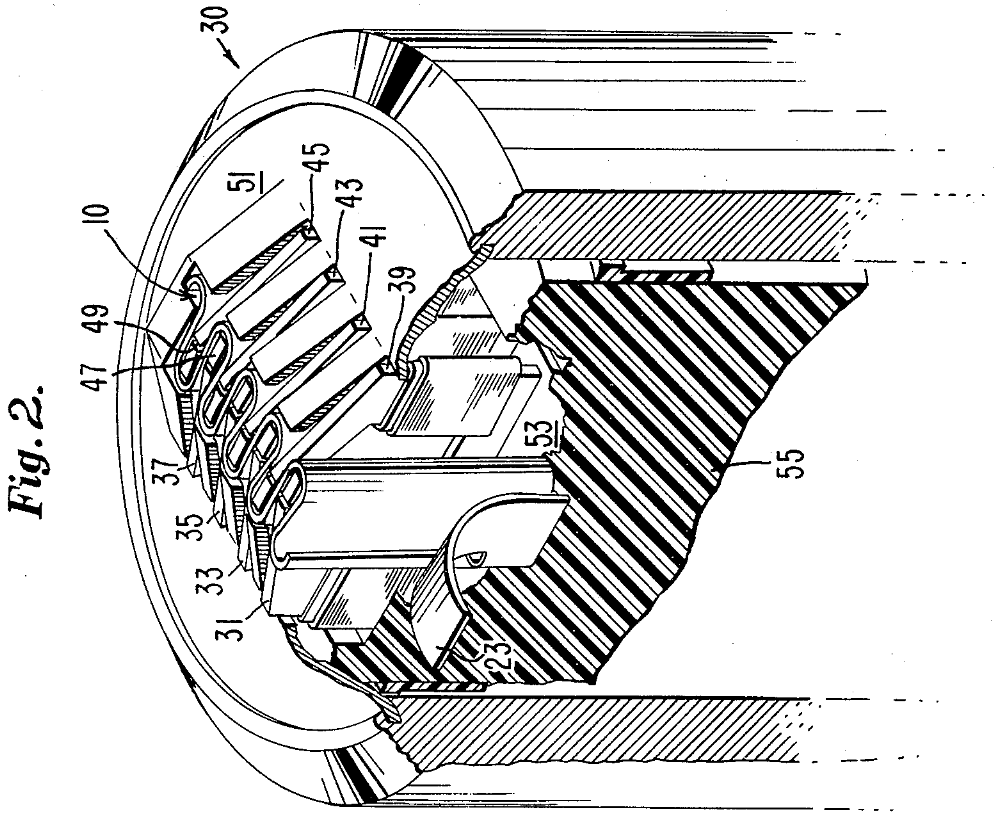
FIGURE 2 is a fragmentary perspective view partially broken away and in section showing the ferrite element holder of the present invention in a plural head magnetic transducer.

Referring to FIG. 2, the ferrite holder 10 is shown as used within a magnetic transducer casing 30. A plurality of ferrite elements 31, 33, 35, 37, 39, 41, 43 and 45 are shown in position within the transducer casing 30 and supported by the holder 10. Since adjacent corrugations and associated gripping faces are oriented in opposite directions, a plurality of ferrite elements can be assembled into a very compact unit with precise alignment of the toe gaps, for example, 47 and 49, and with precise control of the spacing between elements.

Through the use of the ferrite element holder of the present invention, a conductive electrostatic shield is provided between the toe gaps of adjacent ferrite elements which tends to prevent interference between the elements, particularly during the writing phase of operation. The holder 10 is longer than the ferrite elements and tends to prevent any stray coupling across the ends of the ferrite elements remote from the toe gaps. Furthermore, the opposite orientation of the ferrite elements in the holder tends to eliminate cross talk between the coils on adjacent ferrite elements.

The flexures 23 and 25 tend to bias the holder and ferrite elements away from the inner surface of the apertured cap 51 and into tight engagement with a seat 53 provided in a plastic guide member 55. As shown in FIG. 2 the cap 51 has a central raised portion apertured to receive end portions of the ferrite elements. The seat 53 is a recessed end wall of the guide member 55 which together with the cap 51 and side wall of the casing 30 defines a transducer compartment. The severed edges 27, and 29 engage in oppositely disposed slots in the cap 51 to locate the holder 10 as shown in FIG. 2. In this way, the ferrite elements are accurately maintained in alignment through the apertures in the cap 51 and are enabled to be precisely positioned as a unit by movement of the transducer 30. It can be seen, therefore, that the holder of the present invention provides not only precise mechanical alignment and positioning of the ferrite elements but also provides magnetic shielding features enabling the assembly of compact, multielement magnetic transducers.

It will be apparent that many changes and modifications of the several features described herein may be made without departing from the spirit and scope of the invention. It is therefore apparent that the foregoing description is by way of illustration of the invention rather than limitation of the invention.

While there has been described what is at present considered to be the preferred embodiment of the invention, it will be understood that various modifications may be made therein which are within the true spirit and scope of the invention as defined in the appended claims.

We claim:

1. In a multiple magnetic transducer device, a casing having an end, a cap closing the end of said casing and having a centrally disposed apertured raised portion, a body of magnetic insulating material within said casing having an end wall spaced from said cap and cooperating with said cap and said casing to define a transducer compartment, a plurality of transducer cores within said compartment in spaced apart relationship across said cap and exposed to the interior of said chamber, said transducers each having spaced apart end portions projecting into the aperture in the raised portion of said cap and extending therefrom toward the wall of said magnetic insulating body, and a sinuous conductive electrostatic shield web forming oppositely facing recesses respectively receiving the end portions of said cores to space them apart and shield them against magnetic flux interchange.

References Cited

UNITED STATES PATENTS

| | | | |
|---|---|---|---|
| 1,222,728 | 4/1917 | Brown | 211—120 |
| 2,138,914 | 12/1938 | Frey | 211—120 |
| 2,530,307 | 11/1950 | Leach | 211—120 |
| 2,888,522 | 5/1959 | McCutchen | 179—100.2 |

FOREIGN PATENTS

| | | |
|---|---|---|
| 884,265 | 12/1961 | Great Britain. |

BERNARD KONICK, Primary Examiner

W. F. WHITE, Assistant Examiner

U.S. Cl. X.R.

24—81; 179—100.2; 211—120; 346—74